United States Patent [19]

Lambert et al.

[11] Patent Number: 5,894,649
[45] Date of Patent: Apr. 20, 1999

[54] HEAT EXCHANGER ASSEMBLY UTILIZING GROMMETS AND INTEGRAL CAST TANKS

[75] Inventors: Marco Lambert, Manchester; Michael J. Kolb, Southington, both of Conn.

[73] Assignee: Transpro, Inc., New Haven, Conn.

[21] Appl. No.: 08/920,304

[22] Filed: Aug. 28, 1997

[51] Int. Cl.$^6$ .................................................. B23P 15/26
[52] U.S. Cl. ........................... 29/890.052; 29/890.127; 165/173
[58] Field of Search .................. 29/890.052, 890.038, 29/890.127, 527.5; 165/173, 175; 164/47, 464, 132, 459, 421

[56] References Cited

U.S. PATENT DOCUMENTS

| | | | |
|---|---|---|---|
| 1,537,299 | 5/1925 | Green | 164/47 |
| 2,380,002 | 7/1945 | Wetherby-Williams | 113/118 |
| 2,895,188 | 7/1959 | Wittmoser | 164/421 |
| 3,113,615 | 12/1963 | Huggins | 165/149 |
| 4,023,611 | 5/1977 | Clemens et al. | 164/69 |
| 4,125,280 | 11/1978 | Kuzel | 285/137 |
| 4,382,464 | 5/1983 | Melnyk | 165/76 |
| 4,637,133 | 1/1987 | Freeman | 29/727 |
| 4,682,650 | 7/1987 | Potier | 165/173 |
| 4,756,361 | 7/1988 | Lesage | 165/149 |
| 4,889,105 | 12/1989 | Vago et al. | 126/361 |
| 4,903,389 | 2/1990 | Wolf | 29/890.43 |
| 5,004,047 | 4/1991 | Meier et al. | 165/158 |
| 5,052,475 | 10/1991 | Grundy | 165/76 |
| 5,205,354 | 4/1993 | Lesage | 165/173 |
| 5,223,051 | 6/1993 | Ryntz, Jr. | 29/527.5 |
| 5,226,235 | 7/1993 | Lesage | 29/890.47 |
| 5,247,985 | 9/1993 | Sulprizio | 164/47 |
| 5,257,662 | 11/1993 | Osborn | 165/173 |
| 5,373,896 | 12/1994 | Osborn | 29/890.052 |
| 5,407,004 | 4/1995 | DeRisi et al. | 165/153 |

FOREIGN PATENT DOCUMENTS

| | | |
|---|---|---|
| 29777 | 9/1916 | United Kingdom . |
| 338685 | 11/1930 | United Kingdom ... 165/175 |
| 390296 | 2/1932 | United Kingdom ... 165/173 |
| 901141 | 7/1962 | United Kingdom . |
| 2082312 | 3/1982 | United Kingdom . |

OTHER PUBLICATIONS

G & O Radiator, Core Service Catalog No. 96 (5 pages).
Allen Group Catalog No. 708, 1983 Weatherly Index 410, *For Passenger Cars and Light Trucks* (4 pages).

*Primary Examiner*—S. Thomas Hughes
*Assistant Examiner*—Marc W. Butler
*Attorney, Agent, or Firm*—DeLio & Peterson, LLC

[57] ABSTRACT

A heat exchanger comprises an as-cast combined header and tank having a header portion integral with a tank portion. The cast header and tank combination has a plurality of openings originally cast in the header portion of the combination and at least one opening originally cast in the tank portion of the combination for passage of coolant into or out of the cast header and tank combination. Tubes are received in and extends through the header portion openings, and resilient grommets seal the tubes to the header portion to prevent leakage around the tubes. In making the heat exchanger, there is provided an inner mold section and outer mold section corresponding respectively to the interior and exterior configurations of a desired combined header and tank having a header portion integral with a tank portion. The inner mold and outer mold sections are connected through the header and tank portion openings to support the inner mold section within the outer mold section and create a space therebetween corresponding to the configuration of the combined header and tank. The space is filled with molten metal and solidified to create the combined cast header and tank having the header portion integral with a tank portion. The outer mold section is removed and the inner mold section is removed from inside the cast header and tank through an opening in the header portion and/or through an opening in the tank portion. Following removal of the mold portions, the method may include inserting a tube from a heat exchanger core into an opening in the cast header portion and securing the tube therein.

12 Claims, 8 Drawing Sheets

HEAT EXCHANGER ASSEMBLY UTILIZING GROMMETS AND INTEGRAL CAST TANKS

BACKGROUND OF THE INVENTION

1. Field of the Invention

This invention relates to heat exchangers and, more particularly, to motor vehicle heat exchangers utilizing grommets in the tube-to-header joints.

2. Description of Related Art

Heat exchangers, particularly those utilized in motor vehicles, may be liquid-to-air heat exchangers, (e.g., radiators for engine coolant, air conditioning condensers and evaporators, and oil coolers) or may be air-to-air heat exchangers (e.g. charge air coolers). Liquid-to-air and air-to-air heat exchangers are typically composed of an inlet tank or manifold, an outlet tank or manifold, and a large number of tubes extending between the tanks or manifolds which carry the fluid to be cooled. Headers are normally provided on the tanks for mechanical attachment and fluid connection of the tubes. Fins attached to the tubes transfer heat between the liquid or gas inside the tubes and the ambient atmosphere outside. A mechanical framework or structure is usually included to provide structural strength to the assembly and to provide means for mounting the unit to the vehicle or other machinery on which it is used.

As shown in FIGS. 1 and 2, a typical heat exchanger core, in this case radiator core 20, is comprised of a plurality of vertical, parallel, spaced tubes 22 between which are interposed heat transfer fins. These fins may be of the flat type 24 or the serpentine type 26 in the composite core depicted in FIG. 1. Any of these fin styles may include louvers (not shown) to enhance heat transfer. The fins are typically formed of strips of aluminum, brass, copper or other thermally conductive metal or alloy. Flat fins 24 are generally made of sheet metal which has a collar formed about a hole. Tubes 22 may be inserted through the collared openings and a plurality of fins may be stacked in order to make up the fin array within the core. Serpentine fins may extend in a serpentine pattern wherein the strips are configured with a plurality of alternating bends between adjacent tubes. The root of the bend is generally secured by brazing or soldering to the tube. A strip portion between the roots extends between the tubes. In serpentine fins 26 the pattern is similar to that of a sine wave, while in serpentine fins 30 (FIG. 2) the pattern is zig-zag. The ends of tubes 22 extend beyond the fin array of core 20 to connect to the headers and tanks.

Headers 28a and 28b are at the top and bottom, respectively, of core 20 and are plates having openings therein to receive and seal the upper and lower ends of the tubes 22. Upper and lower tanks 34a and 34b, respectively, are normally welded or soldered to headers 28a and 28b respectively and contain an inlet 36 and outlet 38 for the heat exchanger. Side support rails 32 or other structure may be used to secure the tanks and headers on either side of the core and enable the completed heat exchanger to be secured within the vehicle or machinery frame.

The tubes utilized may be either round or oval, or may be oval with circular ends. Prior art methods of welding tube-to-header joints are disclosed, for example, in U.S. Pat. No. 5,407,004, the disclosure which is hereby incorporated by reference.

In use, heat from the hot liquid or air within generally causes the tubes to expand and grow in length due to thermal expansion. Since the tanks or manifolds are fixed with respect to each other by the unit framework or structure, the growth in length of tubes places high mechanical stresses on the tanks and the associated headers, particularly in the area of the joints between the tubes and headers. In addition, the pressure of the hot liquid or hot air within the heat exchanger tends to distort the tanks or manifolds and headers, creating further stresses on the tube-to-header joints. The combination of stress resulting from thermal expansion and internal pressure can result in early failure of heat exchangers. Cracks in the joints between the tubes and the headers are the most common mode of failure. Many approaches have been taken to avoid heat exchanger failures due to thermal expansion and internal pressure. Most approaches fall into one or two categories: 1) those which improve the strength of the areas prone to failure and 2) those which provide resilience in the areas prone to failure. Approaches which provide resilience have appealed to designers because they provide a solution to the stresses of thermal expansion and internal pressure with a greater economy than any approach which must provide more material to achieve an improvement in strength.

Engine cooling radiators for vehicles have sometimes been designed with resilient tube-to-header joints. Locomotive radiators have been manufactured by the assignee of the present invention for over thirty (30) years using headers of special resilient design as shown in FIG. 3. Metallic headers 28 are mechanically attached to tanks (not shown), such as by bolting, and have oversized holes or openings in them to receive oval brass tubes 22 extending from the radiator core. Fins 24 of the flat plate-type design have collars 25 fitted around the tubes. Within the openings in the header there are placed oval brass ferrules 44. These ferrules are bonded to the header by molded silicone rubber 40. The ferrules are then soldered to the core tubes extending therethrough to form a leak-free, resilient joint between the tubes and the headers. While this has been an extremely effective design under typical operating conditions for locomotives, it is expensive to produce.

In the 1970's, radiators for automobiles were produced which utilized round aluminum tubes, aluminum plate fins, aluminum headers and plastic tanks. A sheet of molded rubber provided resilient grommets at each tube hole in the header, and also provided a gasket for sealing the headers to the plastic tanks, which were attached to the headers by means of crimped tabs on the headers. The insertion of the tubes into the rubber grommets in the header holes compressed the rubber of the grommets providing a resilient sealing attachment of the tubes to the headers. However, considerable force was required to insert all the core tubes into the header holes simultaneously. This design was limited to relatively small units because of the problems of core and header distortion during assembly and because of the close tolerance which was required to accomplish the mating of the core tubes to the header with the desired amount of grommet compression.

Other radiators have also utilized rubber grommets in their tube-to-header joints. These radiators have been designed around individual finned tubes having round ends and oval cross-sections which are finned along most of their length. As in the previous design, sealing of the tubes to the header was accomplished by compression of the grommets between the tubes and the header. However, in this alternative design, the tubes were assembled to the headers individually thereby avoiding high assembly forces. This allowed the construction of very large radiators for heavy construction equipment. However, it has been found that the use of tubes with round ends limits this design to cores having rather wide tube spacing which results in relatively poor thermal performance compared to most radiator core designs.

U.S. Pat. Nos. 4,756,361 and 5,205,354 describe a radiator which utilizes tubes which are circular in cross-section throughout their length. This type of design is shown in FIG. 4 in which tubes 22 are pressed through collar openings 25 in flat plate fins 24. The tube ends extend through silicone rubber grommets 42 which are disposed in openings within header plate 28. The grommets have a central peripheral groove and top and bottom lips or flanges which extend outward on the top and bottom of the header plate. Because of its round tubes, this design also suffers from poor thermal performance compared to most radiator designs and must have close tolerances to achieve the required compression of the grommet between the tube and header opening to seal the joint. U.S. Pat. Nos. 5,052,475 and 5,226,235 disclose use of circular grommets to seal circular tubes into soldered tanks and welded tanks, respectively. British Patent No. 29,777 discloses the use of round tubes and grommets with a tube plate cast integrally with the header, but the tube openings are drilled or otherwise formed in the tube plate after the casting is made.

Currently, air-to-air heat exchangers using brazed aluminum cores having oval tubes are being produced commercially. Aluminum headers having oversized oval openings are welded to cast aluminum manifolds. (Full cast tank/header combinations are not believed to be used.) Oval silicone rubber grommets, otherwise similar to those described in the aforementioned '361 patent, are inserted into the openings in the headers of the welded tanks. Such extensive soldering, welding and machining relating to the tank/header combinations heat exchangers utilizing grommets adds undesirable handling and other costs to the manufacturing process.

Bearing in mind the problems and deficiencies of the prior art, it is therefore an object of the present invention to provide an improved heat exchanger which utilizes grommets in a tube-to-header joints and may be readily manufactured without welding or soldering.

It is a further object of the present invention to provide an improved method of assembly of a heat exchanger which utilizes grommets in the tube-to-header joint of a tank which integrally includes the header manufactured with a minimum of machining.

It is a further object of the present invention to provide an improved method of manufacturing a header and tank assembly for a heat exchanger.

SUMMARY OF THE INVENTION

The above and other objects which will be apparent to those skilled in the art are achieved in the present invention which provides a heat exchanger comprising an as-cast combined header and tank having a header portion integral with a tank portion. The cast header and tank combination has at least one opening originally cast in the header portion of the combination and at least one opening originally cast in the tank portion of the combination for passage of coolant into or out of the cast header and tank combination. A tube is received in and extends through a header portion opening, and sealing means seals the tube to the header portion to prevent leakage around the tube.

In another aspect, the cast header and tank combination has a plurality of openings originally cast in the header portion of the combination for passage of coolant into or out of the cast header and tank combination. Tubes are received in and extend through the header portion openings, and sealing means seals the tubes to the header portion to prevent leakage around the tubes.

Preferably, the sealing means comprises a resilient grommet, and the header portion opening, the tube cross-section, and the grommet are oval. More preferably, the combined cast header and tank has a rectangular header portion with a length greater than a width and a single row of a plurality of oval header openings extending along the length thereof, the oval header openings having a major diameter extending in the direction of the width of the header portion.

In a further aspect, the present invention provides a method of making a heat exchanger comprising the steps of:

a) providing a combined cast header and tank having a header portion integral with a tank portion, the cast header and tank combination having at least one opening originally cast in the header portion of the combination and at least one opening originally cast in the tank portion of the combination for passage of coolant into or out of the cast header and tank combination;

b) providing a tube from a heat exchanger core for insertion within the header opening; and c) sealing the tube to the header portion opening.

Alternatively, step (a) of the aforementioned method comprises providing a combined cast header and tank having a header portion integral with a tank portion, the cast header and tank combination having a plurality of openings originally cast in the header portion of the combination for passage of coolant into or out of the cast header and tank combination.

Step (c) of the aforementioned method may comprise:

c1) providing a resilient grommet having a body portion for extending within the header opening(s);

c2) inserting the grommet into the header opening(s); and c3) inserting the tube(s) into the header portion opening(s) and through the grommet body portion.

The method may further include the step of finishing the header portion cast opening prior to step (c).

In yet another aspect, the present invention provides a method of making a heat exchanger comprising the steps of:

a) providing an inner mold section and outer mold section corresponding respectively to the interior and exterior configurations of a desired combined header and tank having a header portion integral with a tank portion, each of the header and tank portions having at least one opening therein for passage of coolant;

b) connecting the inner mold and outer mold sections through the header and tank portion openings to support the inner mold section within the outer mold section and create a space therebetween corresponding to the configuration of the combined header and tank;

c) filling the space with molten metal and solidifying the molten metal to create a combined cast header and tank having a header portion integral with a tank portion, the cast header and tank combination having at least one opening in the header portion and at least one opening in the tank portion for passage of coolant into or out of the cast header and tank combination;

d) removing the cast header and tank from the outer mold section; and e) removing the inner mold section from the cast header and tank.

Alternatively, the method comprises the steps of:

a) providing an inner mold section and outer mold section corresponding respectively to the interior and exterior configurations of a desired combined header and tank having a header portion integral with a tank portion, the header portion having a plurality of openings therein for passage of coolant;

b) connecting the inner mold and outer mold sections through the header portion openings to support the inner mold section within the outer mold section and create a space therebetween corresponding to the configuration of the combined header and tank;

c) filling the space with molten metal and solidifying the molten metal to create a combined cast header and tank having a header portion integral with a tank portion, the cast header and tank combination having a plurality of openings in the header portion for passage of coolant into or out of the cast header and tank combination;

d) removing the cast header and tank from the outer mold section; and e) removing the inner mold section from the cast header and tank.

Preferably, the inner mold section is removed from the cast header and tank through an opening in the header portion and/or through an opening in the tank portion. Following removal of the mold portions, the method may include inserting a tube from a heat exchanger core into an opening in the cast header portion and securing the tube therein.

BRIEF DESCRIPTION OF THE DRAWINGS

The features of the invention believed to be novel and the elements characteristic of the invention are set forth with particularity in the appended claims. The figures are for illustration purposes only and are not necessarily drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

This invention is directed primarily toward an air-to-air heat exchanger used as a charge air cooler, or intercooler, for turbocharged or supercharged engines. However, it may also be utilized in any other type of heat exchanger, for example, those discussed in the background of the invention, such as radiators, oil coolers and the like. The present invention provides a heat exchanger which has an integral cast combined header and tank with openings in the header portion and a resilient tube-to-header portion joint to minimize tube-to-header stresses due to a combination of a thermal expansion of the tubes and internal pressure in the tanks. Preferably oval tubes are utilized for close tube spacing for optimum heat transfer performance of the core, although other tube shapes and cross-sections may be utilized.

Figure 1:
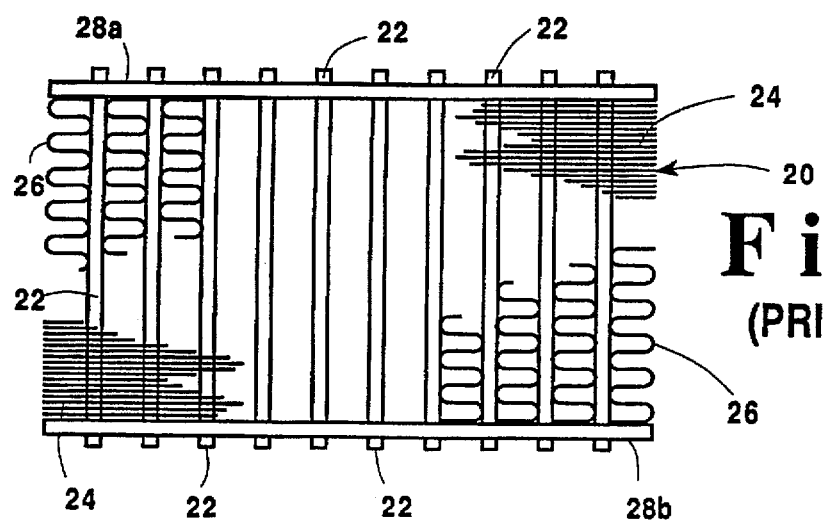
FIG. 1 is a front elevational view of a typical prior art heat exchanger core and header assembly.
Figure 2:
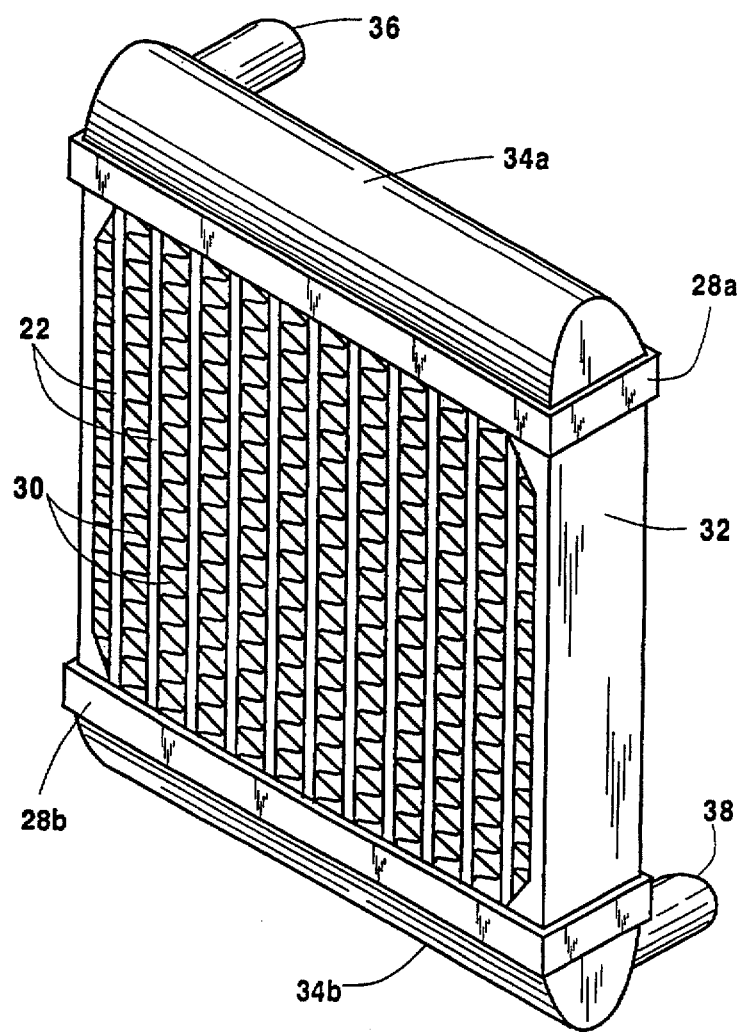
FIG. 2 is a perspective view of a typical assembled radiator of the prior art.
Figure 3:
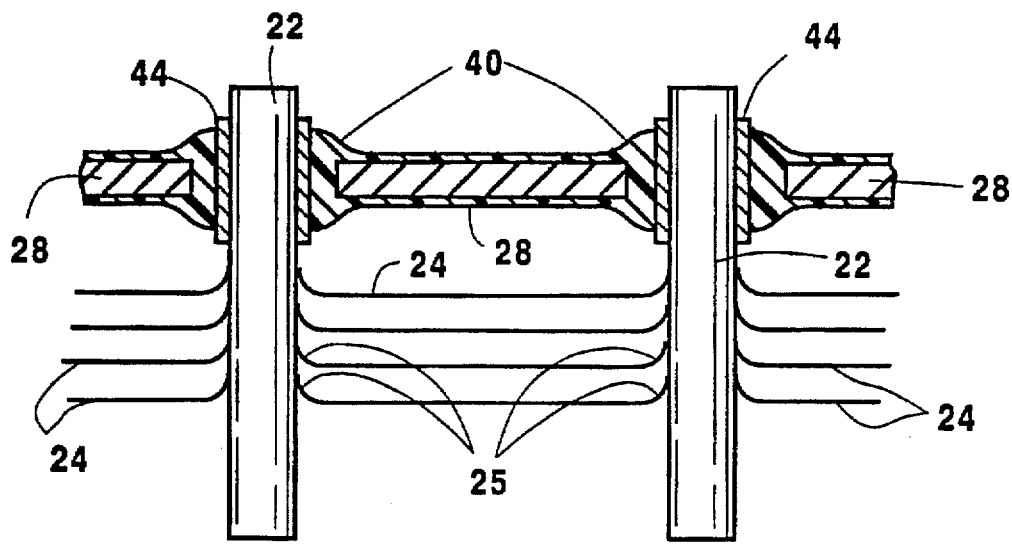
FIG. 3 is a cross-sectional view of a prior art tube-to-header joint which utilizes molded silicone rubber.
Figure 4:
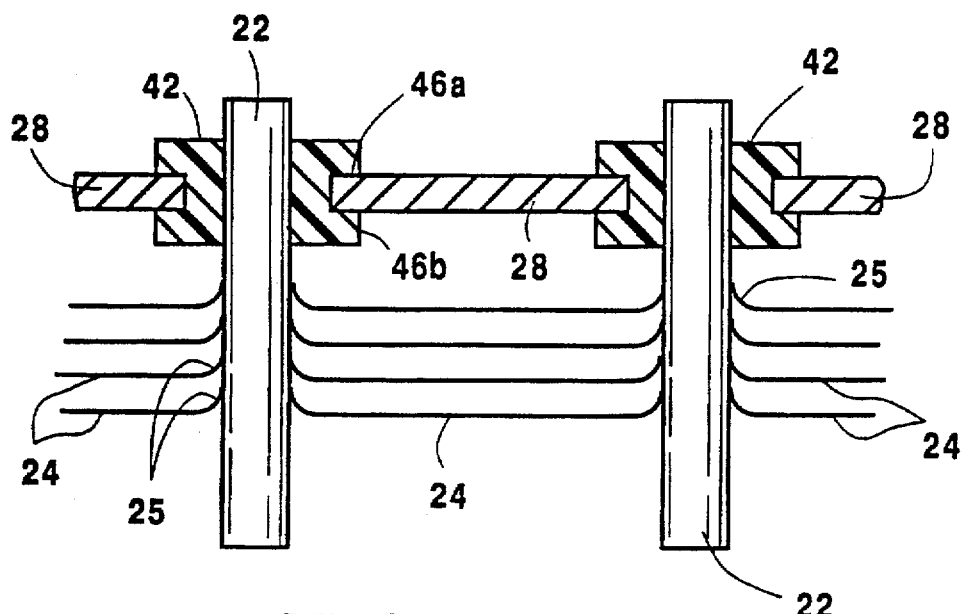
FIG. 4 is a cross-sectional view of a prior art tube-to-header joint which utilizes grommets.
Figure 5:
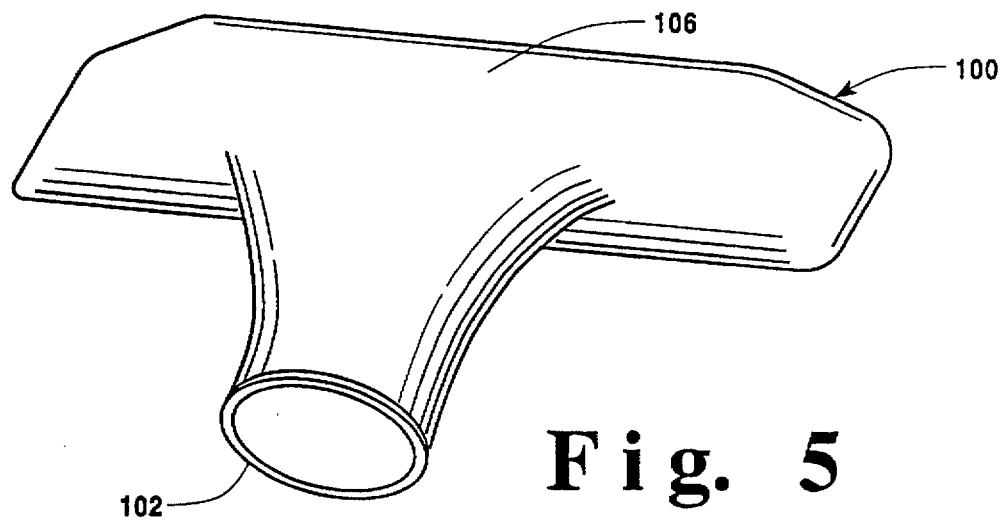
FIG. 5 is a perspective view of the preferred integral cast header and tank of the present invention.
Figure 6:
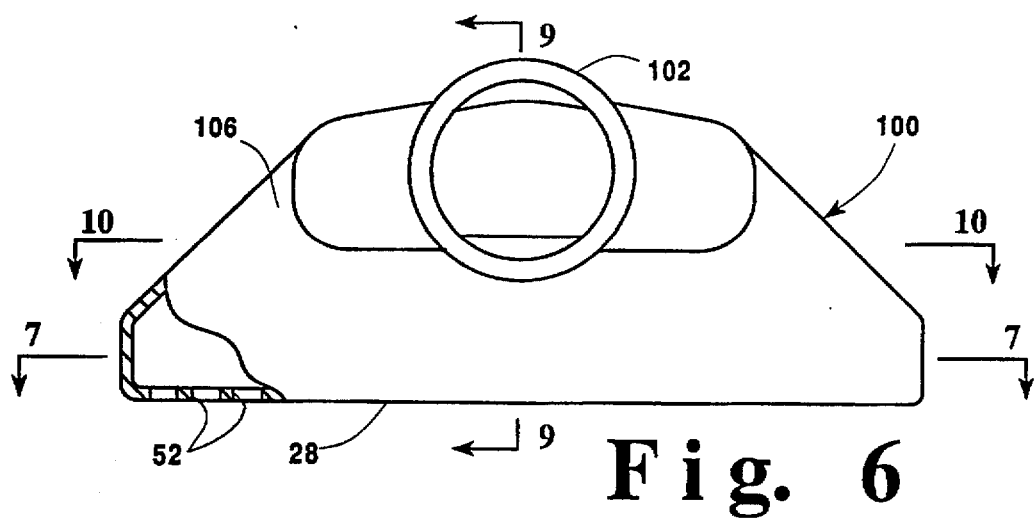
FIG. 6 is a front view of, partially in section, of the integral cast header and tank of FIG. 5.
Figure 7:
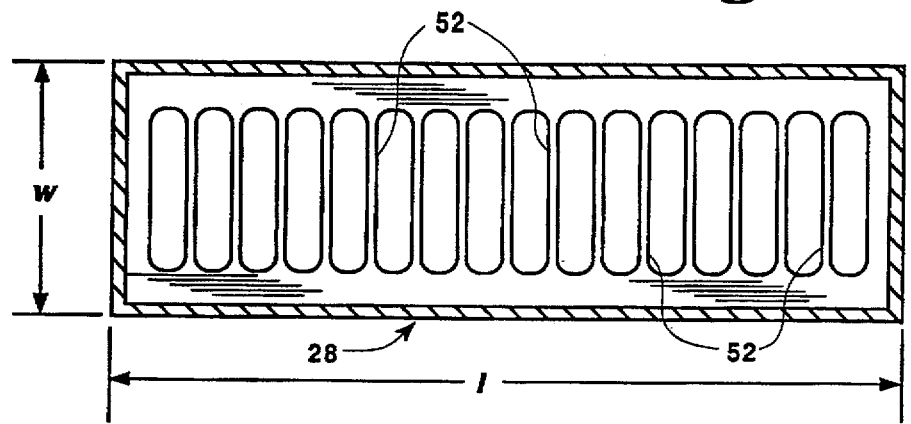
FIG. 7 is a cross-sectional view of the header portion of the integral cast header and tank of FIG. 6 taken along line 7—7.

In accordance with the present invention, the heat exchanger employs a combined cast header and tank having a header portion integral with a tank portion. As shown in FIGS. 5–7, the combined header and tank 100 has a hollow tank portion 106 with an inlet or outlet opening 102 therein for connection to the vehicle and passage of the fluid to be cooled into or out of the heat exchanger assembly. Closing the end portion of the tank 100 is a rectangular integral header portion 28 having a plurality of openings 52 for receiving the resilient grommets and, within the grommets, the tubes from the heat exchanger core assembly.

Header portion openings 52 are preferably oval and are arranged in a single row to receive correspondingly shaped oval grommets and tubes. Alternatively, multiple rows of tubes may be used. As used herein the term "oval" refers to any non-circular shaped axial cross-section (i.e. perpendicular to the axis of the tube) having a generally smoothly curving periphery, such as an ellipse or a rectangle with rounded corners, or other obround or egg shape. Being of oval cross-sectional shape, such tubes and openings will have a diameter in one direction greater than the diameter in another (usually perpendicular) direction, which are referred to herein as the "major diameter" and "minor diameter" respectively. While oval shaped tubes and, consequently, oval shaped header openings and grommets are preferred, other tube, opening and grommet configurations can be used, such as circular or rectangular.

Header portion 28 is preferably of rectangular configuration, with a length l greater than width w. The openings 52 are aligned so that the longer dimension of the oval shown is in the direction of the width of header portion 28, and extends substantially across the entire width w. The individual openings 52 are then aligned side-by-side along the length l of header portion 28 in a single row.

Figure 8:
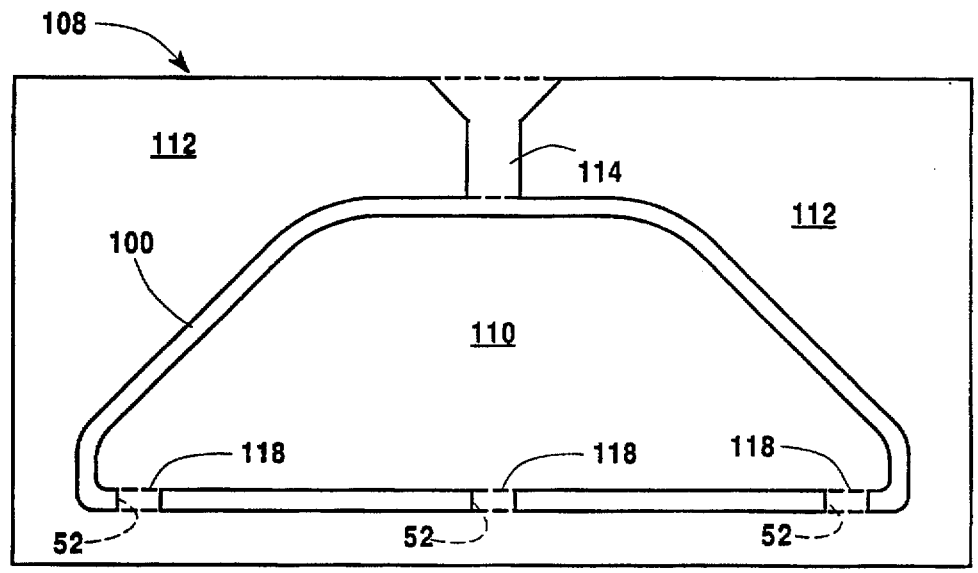
FIG. 8 is a rear sectional view of the integral header and tank of FIG. 5 while in the casting mold.
Figure 9:
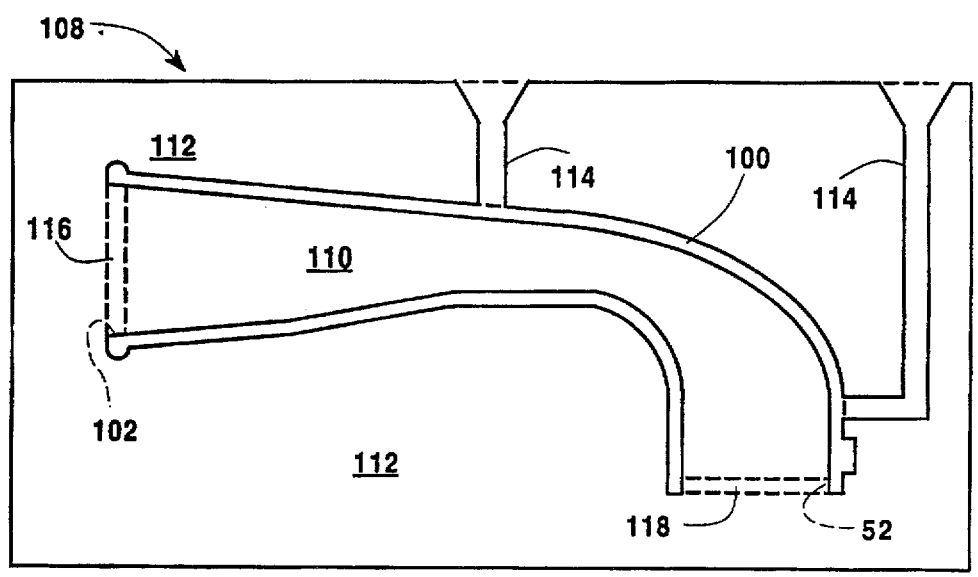
FIG. 9 is a side sectional view of the integral header and tank of FIG. 5 while in the casting mold.
Figure 10:
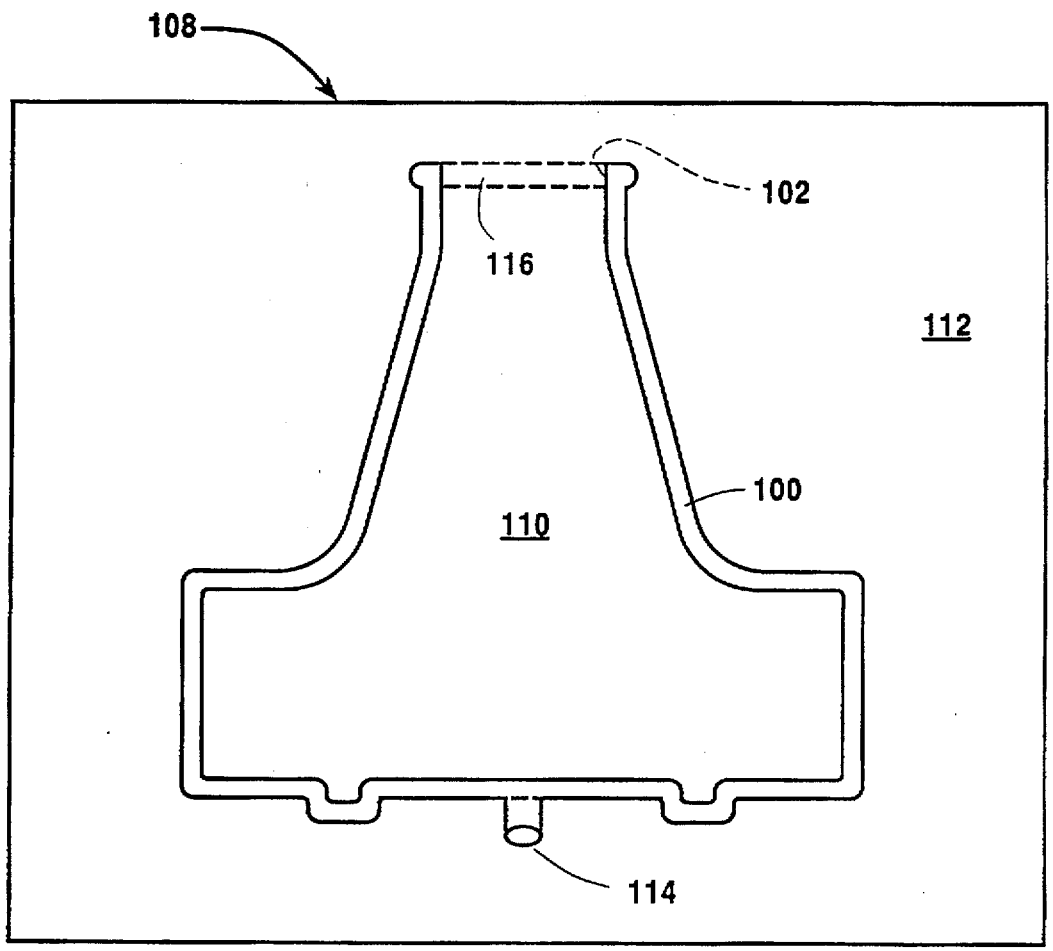
FIG. 10 is a top sectional view of the integral header and tank of FIG. 5 while in the casting mold.

Rear, side and top sectional views of the preferred integral header and tank are shown in connection with the casting mold in FIGS. 8, 9 and 10, respectively. Mold 108 comprises an outer mold section 112 whose inner surface conforms to the outer surface of integral header and tank 100, and an inner mold or shell core portion 110 whose outer surface conforms to the inner surface of integral header and tank 100. Preferably both outer mold section 112 and shell core section 110 are made of sand or a combination of sand and a resin which are packed and formed to create the approximate configuration in their inner and outer surfaces respectively. In creating the mold 108, the shell core 110 is more preferably formed by pouring a resin and sand mixture into a mold (shell core box) which has the configuration of the interior surface of the integral header and tank 100. The mold is then heated to cure the resin and sand mixture on the surface, thereby forming a rigid shell, after which the heating is discontinued before the interior of the resin and sand mixture cures. The shell core is then removed from the shell core box, and the uncured sand and resin from the interior is removed through an opening, leaving a hollow shell core. After shell core 110 is completed, it is placed inside mold 112 (preferably formed in two pieces to conform to the exterior surface of integral header and tank 100), thereby creating a space therebetween which conforms to the integral header and tank combination 100.

In accordance with the present invention, it has been found that shell core 110 may be connected to and supported within outer mold section 112 by portions of the packed and formed sand or sand/resin mixture at region 116, which conforms to the inlet/outlet 102 of the tank portion, and sections 118 which conform to the header portion openings 52. It is preferred that the shell core 110 and outer section 112 of the mold be connected at both the inlet/outlet opening (mold section 116) and at least one of the header portion openings (mold section 118). Runner sections 114 are formed within outer section 112 in order to deliver molten metal to the various sections of the mold.

After the space between the inner mold section and outer mold section is filled with molten metal, for example, molten aluminum, and the metal is permitted to cool and solidify, the inner and outer mold sections are removed from around the finished integral cast header and tank combination 100. Removal may typically involve breaking the sand and/or sand/resin mixture by shaking and/or vibration. Because the shell core material 110 is within the finished cast header and tank combination, the pieces thereof may be removed through the inlet/outlet opening 102 and/or header portions openings 52 as desired.

Following removal of the finished integral cast header/tank combination, further machining or finishing operations may be made as desired. For example, the inlet/outlet opening 102 and/or header portions openings 52 may be further finished such as by machining if desired to insure closer tolerances for these openings. Alternatively, the openings may be left as cast for use in the final assembly of the heat exchanger. Also, other openings, including other header portion openings 52, may be machined into the casting.

Figure 11:
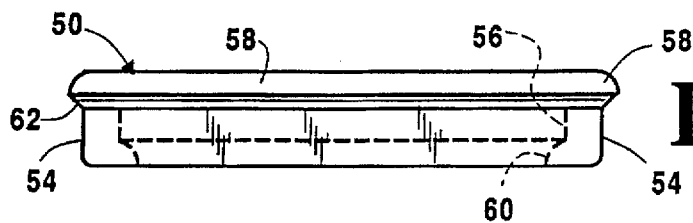
FIG. 11 is a side elevational view of the preferred grommet used in the heat exchanger of the present invention.
Figure 12:
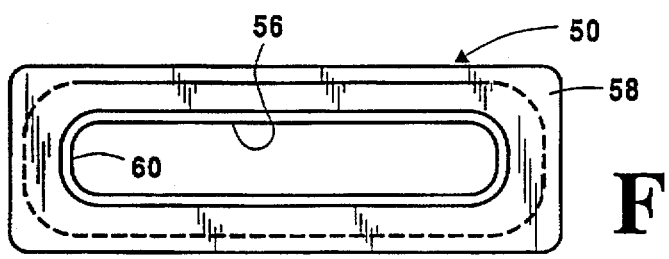
FIG. 12 is a top plan view of the grommet of FIG. 11.

Grommets are the preferred sealing means between the tube(s) and the header portion openings, although other sealing means may be used if desired such as welding, soldering and adhesive bonding. The preferred grommet of the present invention is depicted in its unstressed or undeformed condition in FIGS. 11 and 12. Grommet 50 is preferably made of a silicone rubber or other resilient, flexible or compliant polymer or other material which provides good sealing against the other components of the heat exchanger which are typically made of a metal or alloy. Grommet 50 comprises a body portion having an opening therein to receive the tube from a heat exchanger core. A radially outwardly extending lip or flange 58 is disposed at a first, upper end of the body portion and a radially inwardly extending lip or flange 60 is disposed at a second, lower end of the grommet. It should be understood that relative directional terms are used herein for reference only in connection with the drawings and the grommet and other components may be utilized in any position, including those other than that shown. Outward lip 58 has an angular portion 62 extending down and inward to the outer wall section 54 of the grommet, which extends straight downward from there to the lower end of the grommet. Inner wall 56 extends straight downward from the upper end of the grommet until it reaches radially inwardly projecting lip 60. As seen in the side elevation shown in FIG. 11, both upper and lower lips 58 and 60 have generally rounded corners. However, any other shape or configuration of these lips may be utilized. Also, the body portion of grommet 50 may be conical in shape.

Figure 13:
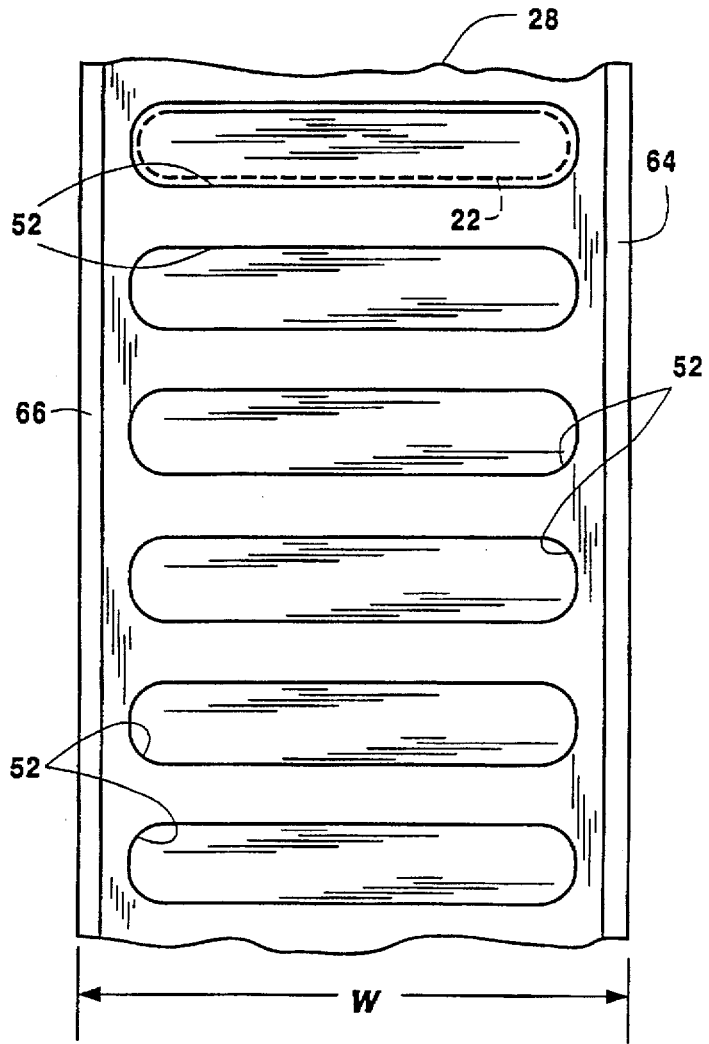
FIG. 13 is a bottom plan view of the header portion of the integral header and tank of the present invention having openings for oval tubes prior to insertion of the grommet.

Grommet 50 has a configuration which conforms to the shape of the oval openings 52 in header portion 28 which are sized to receive tubes 22 from the header core (see FIG. 13). During assembly, it is preferred that grommet 50 is inserted first into header opening 52. Following that, the tube of the heat exchanger core is inserted into the grommet. Since the upper lip or flange 58 is the only portion of the grommet extending radially outwardly from the body, insertion from one side of the header is facilitated. Preferably, the grommet is inserted from the so-called "air" side of the header portion, i.e., the side of the header portion which is exposed to surrounding atmosphere external to the heat exchanger. The lower end of the grommet having the inwardly projected end is inserted into the header portion opening first and, after insertion, extends from the so-called "fluid" side of header portion 28, i.e., the side which is exposed to the air or liquid inside the heat exchanger. After full insertion, outward lip 58 remains external to header portion opening 52 and preferably contacts the air side surface of the header portion.

In FIG. 13, it is seen that the width w of header plate 28 is only slightly greater than the major diameter of header openings 52 (and only slightly greater than the major diameter of tube 22 shown in phantom line inserted into the header opening). This minimizes header flexing and achieves maximum header portion strength. Additionally, the header portion is preferably made with a relatively flat or planar central section which contains the openings for the tube ends.

Preferably, the inner diameter of the inward lip 60 is less than the outer diameter of the tube end so that, after full insertion of the tube, the outer wall of the lower end of grommet 50 is forced radially outward. Because of the resilience of the grommet material, the tube stretches the grommet in the lower region and flexes its walls to provide good sealing contact between the inward lip 60 and the outside surface of tube end 48 and form a tight seal around the tube (see FIGS. 14 and 15, discussed below). Additionally, the expansion of inward lip 60 bulges or forces outward grommet outer wall portion 54 which locks against and forms a seal with the edge of header portion opening 52 to prevent the grommet from slipping back out of the header portion opening. Sealing of the grommet to the tube and the header portion is further enhanced by the action of internal pressure inside the tank/header assembly which serves to force the lip 60 radially inward into tighter contact with both the tube and the header portion, in the manner of an O-ring seal. The inside surface of the upper end 58 of the grommet may be also forced inward to contact the tube outer surface to seal against leakage. Additionally, the lower outside edge of outward lip 58 also may seal against the edge of the header portion opening 52 to provide an additional seal.

Figure 14:
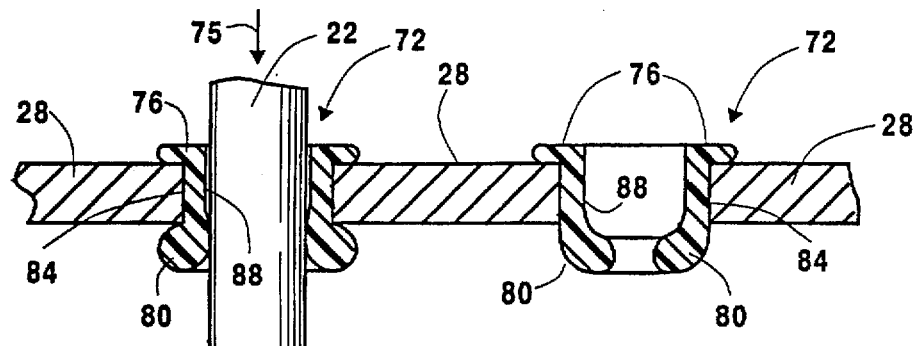
FIG. 14 is a cross-sectional view of an alternative embodiment grommet in the tube-to-header portion joint of the integral header and tank of the present invention.
Figure 15:
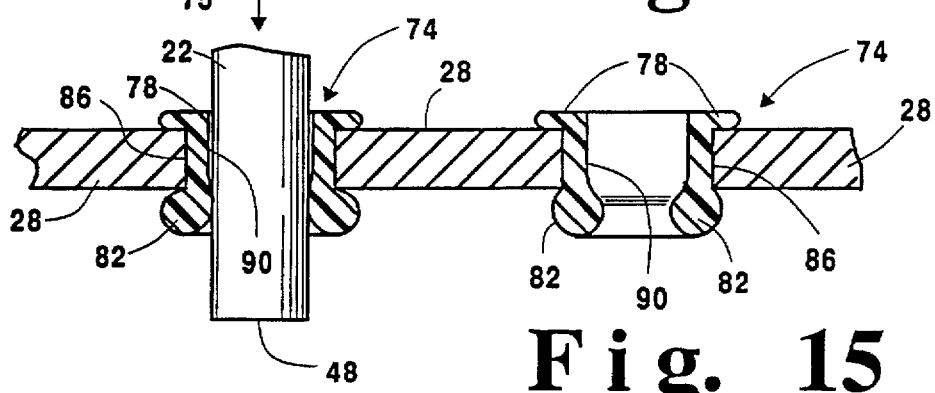
FIG. 15 is a cross-sectional view of another alternative embodiment grommet in the tube-to-header portion joint of the integral header and tank of the present invention.

Variations in grommet design may be employed, such as those shown in FIGS. 14 and 15. As shown in FIG. 14, the unstressed grommet 72 at the right, without the tube inserted, has an outer surface 84 which curves inward near the lower end before terminating in inward lip 80. Again, outer wall 84 fits snugly against the header portion opening when the grommet is first inserted, but is not oversized so as to distort the shape of the grommet. Upper outward lip or flange 76 also may be rectangular in cross-section, as shown. However, the same principle of operation exists for the alternative grommet 72 configuration. Tube 22 is inserted through the body of the grommet in the direction shown by arrow 75 from the air (upper) side of header portion 28 so that lower inward lip 80 seals against tube 22 and the grommet outer body portion is thereby forced or stretched outward to lock and seal against the edge of the header portion opening.

FIG. 15 again shows another alternative embodiment 74 of the grommet of the present invention. In this embodiment, the principal difference with previously described grommet 50 is that lower inward lip 82 also includes an outwardly extending portion to enhance the ability of the grommet to lock into the edge of header portion 28 opening when the tube 22 is inserted through the body of the grommet in direction 75. The result of the invention remains the same, that is, the sealing without compression of the grommet between the tube and header portion which permits greater tolerances in the location of tubes vs. header holes.

Thus, in summary, assembly of the heat exchanger utilizing the grommet configuration of the present invention may commence by inserting the grommet into the header portion, the header portion being integrally cast with the tank in a prior step as previously described. Following insertion of the grommets into the header portion openings, preferably from the air side of the header portion, the tubes for the heat exchanger core are then inserted from the same side as the grommet was inserted. The tubes may be inserted individually, one at a time, or preferably may be inserted simultaneously as part of a complete core assembly because of the low assembly force required as a result of the grommet configuration.

Figure 16:
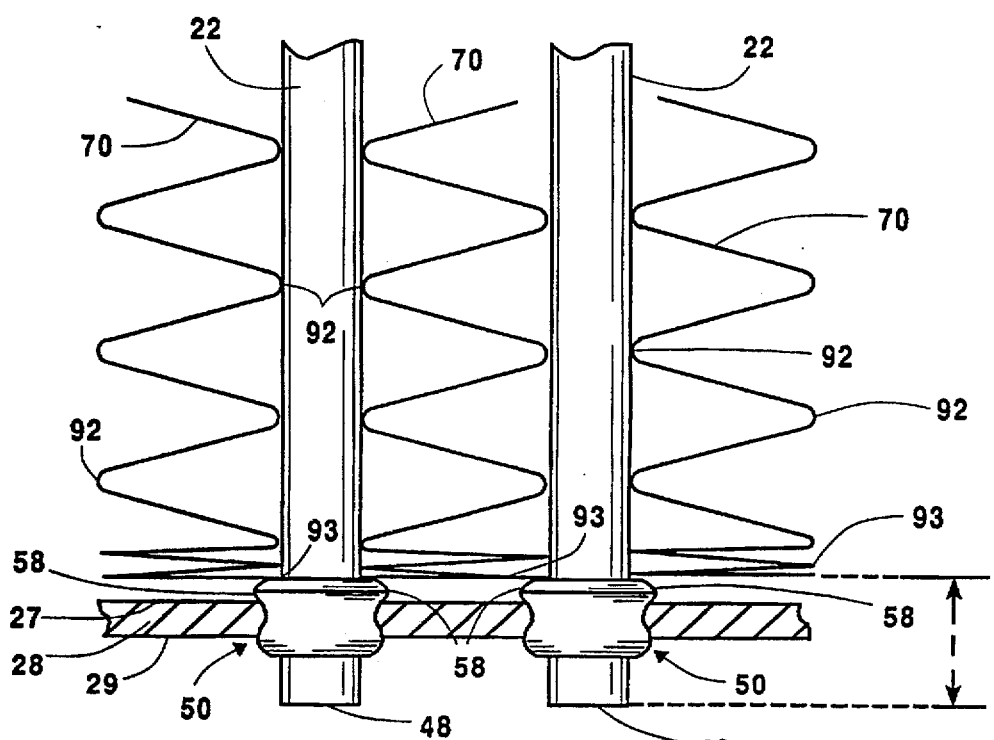
FIG. 16 is an elevational view, partially in cross-section, showing the header portion of the integral header and tank of the present invention mated with tubes and fins in a core utilizing grommets in the joint.

The present invention also contemplates the preferred use of serpentine fins in the core, as shown in FIG. 16. Fins 70 are made of thin metal strip such as copper, aluminum or brass having high thermal conductivity. These serpentine fins 70 are bent in a series of alternating bends so that the roots 92 of the bends contact tubes 22. The fins are soldered or brazed to the tubes at these roots 92 to ensure good thermal conductivity between the tube 22 and the fins 70, and create a unitary core assembly in which the fins connect adjacent tubes and the tubes connect adjacent fins. The portions of fin 70 between alternating roots 92 transfer the majority of the heat from the fluid inside the tube to the ambient air outside of the heat exchanger. Fins 70 continue along tube 22 and terminate at the free end 93 of the strip near tube end 48.

In order to provide space for the header portion and to lock grommets 50 within header portion plate 28, the serpentine pattern of fin 70 is compressed near tube end 48 prior to brazing or soldering the fins to the tubes in the manufacture of the heat exchanger core. More preferably, the strip is also cut so that free ends 93 of substantially all of fins 70 terminate at a position where a root would be, i.e., closely adjacent to or in contact with the tube outer surface, rather than at a point somewhere between the tubes. After assembly, this compression or "combing" of the fins permits the tube ends 48 to extend a length "l" to provide a proper location of the tubes into the tank/header assembly and helps provide locking of the grommet in place in the header portion openings. In this case, the compressed pattern of the fins 70 contacts and pushes against the top lip 58 portion of grommet 50 to hold it securely in place. Additionally, since the free end 93 of fin 70 is cut at the root, instead of at random, this avoids the accidental introduction of portions of the fins into the area between the grommet and the tube.

Figure 17:
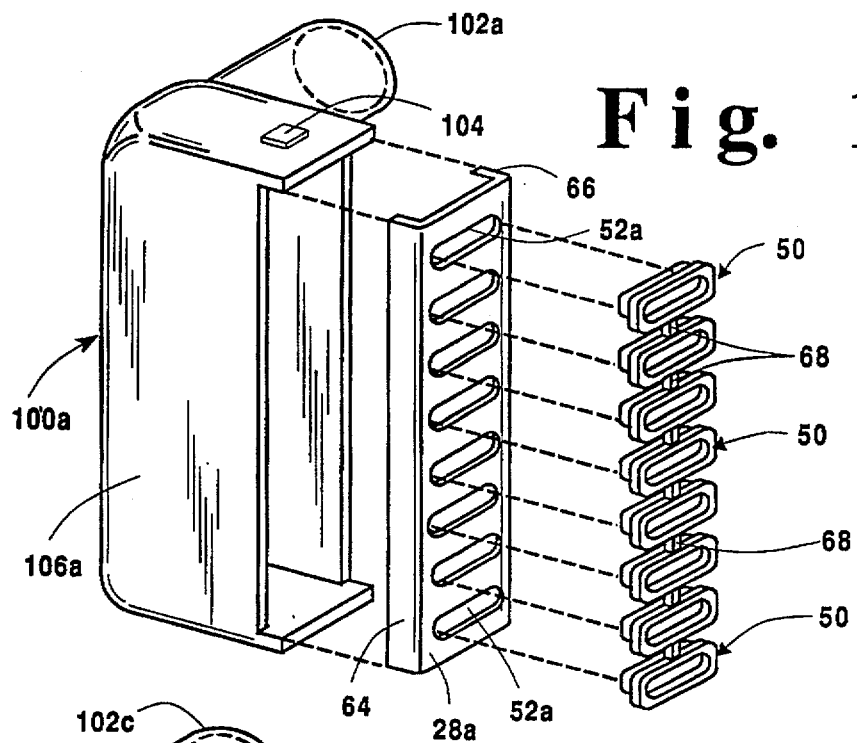
FIG. 17 is an exploded perspective view of the assembly of the integral cast tank and header with the preferred grommets of the invention.

As shown in FIG. 17, cast tank 100a has tank opening 102a as either an inlet or an outlet for the tank and integral header portion 28a containing finished openings 52a for the tubes. Grommets 50 may be inserted into the header portion openings 52a of finished cast header/tank combination 100a. Preferably the individual grommets are connected by a web 68 made out of the same resilient material as the grommets themselves.

Figure 18:
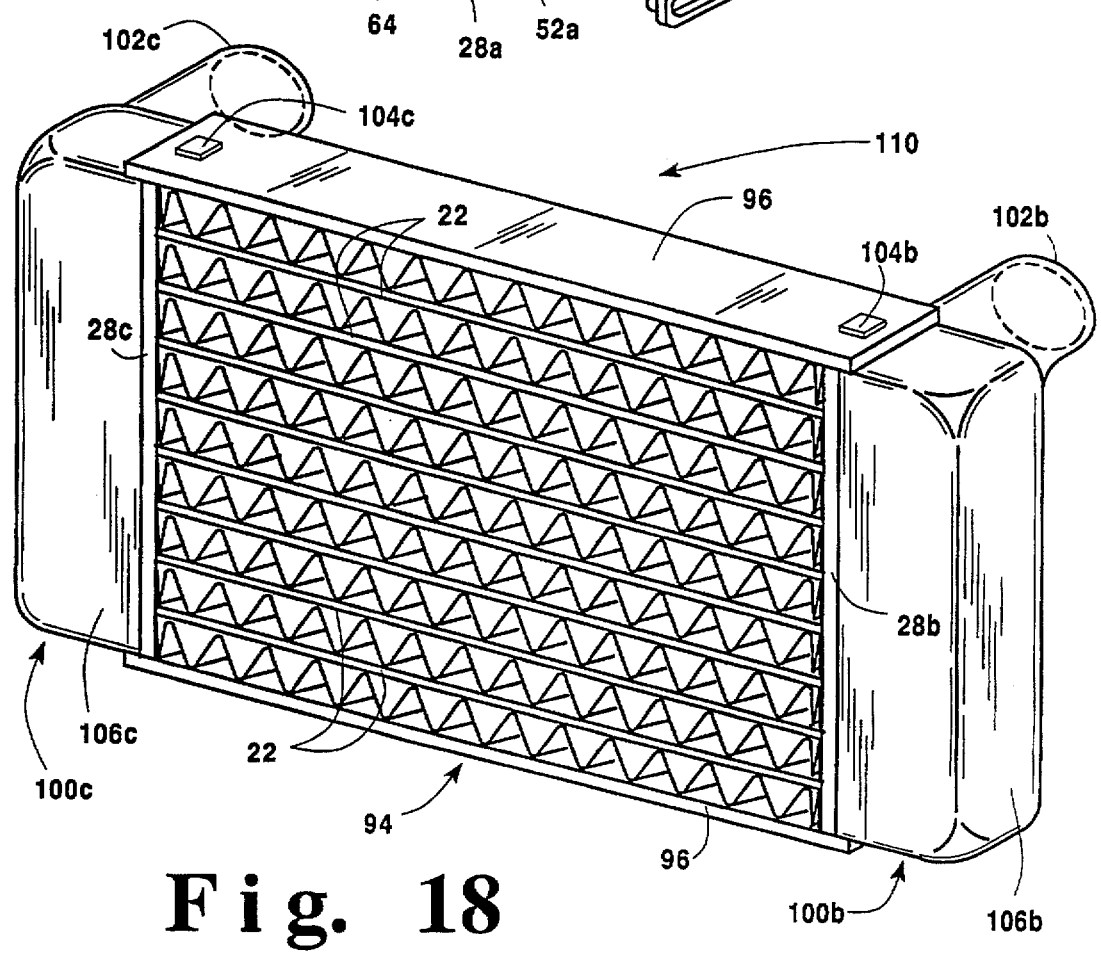
FIG. 18 is a perspective view of an assembled charge air cooler made in accordance with the present invention.

After assembly of the integral tank/header combination and grommets, the entire heat exchanger is assembled. As shown in FIG. 18, heat exchanger 110 comprises the core 94 which has structural core extensions 96 on the upper and lower sides thereof and integral cast header/tanks 100b, 100c have tank portions 106b, 106c, respectively. The core extensions have overhanging ends which mate with corresponding portions of the opposing integral header/tank combinations 100b, 100c. The tube ends extending from the tube-and-fin core assembly are aligned with and partially inserted into the corresponding grommet openings in the header portions 28b, 28c, and an entire tank/header and grommet assembly is then pushed onto the core at either end. A mechanical fastener 104a, 104b is provided to connect the tanks 100b, 100c on either end of core 94. This mechanical fastener is provided so that the tanks may be easily disassembled from the core for servicing. Any type of mechanical fastener may be utilized, such as a bolt or snap-type fitting. Preferably, a snap-on arrangement is preferred which uses a ramped protrusion extending from the tanks which snaps into corresponding openings in the ends of support member 96.

In accordance with the present invention, it has been found that the aforementioned method of casting an integral header/tank combination permits particularly good results when used with resilient grommets to secure the tube ends in the header portion openings. Further, accurate positioning of the tubes with respect to the header portion holes is not critical since the configuration is not dependent on precise compression of the grommet between the tube and the inside of the header portion hole for sealing. The mechanical assembly of the joint between the header portion and tubes and between the core and header/tanks permits easy disassembly of the unit for replacement of the core in the event of damage in the field. The mechanical joint is possible only because of resilient tube-to-header portion joints which minimize tube-to-header portion stresses due to thermal expansion and result in very low stress in the joints between the structural pieces and the tanks. Additionally, the eventual assembly of the charge air cooler or other heat exchanger into the vehicle where it is attached to other structure provides sufficient additional mechanical support so that welding of the side supports is unnecessary.

The invention also provides for use of oval tubes, grommets and header portion holes thus allowing closer spacing of the core tubes compared to using round tubes, grommets and header portion holes. This closer tube spacing in the core will provide optimum heat transfer performance.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been illustrated and described in what are considered to be the most practical and preferred embodiments, it will be recognized that many variations are possible and come within the scope thereof, the appended claims therefore being entitled to a full range of equivalents.

Thus, having described the invention,
What is claimed is:

1. A method of making a heat exchanger comprising the steps of:
   a) providing a combined cast header and tank having a header portion integral with a tank portion, the cast header and tank combination having at least one opening originally cast in the header portion of the combination and at least one opening originally cast in the tank portion of the combination for passage of fluid into or out of the cast header and tank combination;
   b) providing a tube from a heat exchanger core for insertion within the header portion cast opening;
   c) providing a resilient grommet having a body portion for extending within the header portion cast opening;
   d) thereafter inserting said grommet into said header portion cast opening; and
   e) inserting said tube into said header portion cast opening and through said grommet body portion to seal said tube to said header portion opening.

2. The method of claim 1 further including the step of finishing the header portion cast opening prior to step (e).

3. A method of making a heat exchanger comprising the steps of:
   a) providing a combined cast header and tank having a header portion integral with a tank portion, the cast header and tank combination having a plurality of openings originally cast in the header portion of the combination for passage of fluid into or out of the cast header and tank combination;
   b) providing tubes from a heat exchanger core for insertion within the header portion cast openings;
   c) providing resilient grommets having a body portion for extending within the header portion cast openings;
   d) thereafter inserting said grommets into said header portion cast openings; and
   e) inserting said tubes into said header portion cast opening and through the grommet body portion to seal said tubes to said header portion cast openings.

4. The method of claim 3 further including the step of finishing the header portion cast openings prior to step (e).

5. A method of making a heat exchanger comprising the steps of:
   a) providing an inner mold section and outer mold section corresponding respectively to interior and exterior configurations of a desired combined cast header and tank having a header portion integral with a tank portion, each of the header and tank portions having at least one opening therein for passage of fluid;
   b) connecting said inner mold and outer mold sections with mold material through both the header and tank portion openings to support said inner mold section within said outer mold section and create a space therebetween corresponding to the desired interior and exterior configurations of said combined header and tank;
   c) filling said space with molten metal and solidifying said molten metal to create a combined cast header and tank having a header portion integral with a tank portion, the cast header and tank combination having at least one opening in the header portion and at least one opening in the tank portion for passage of fluid into or out of the cast header and tank combination;
   d) removing said cast header and tank combination from said outer mold section;
   e) removing said inner mold section from said cast header and tank combination; and
   f) inserting a tube from a heat exchanger core into said at least one opening in said cast header portion and securing said tube therein.

6. The method of claim 5 wherein step e) comprises removing said inner mold section from said cast header and tank through an opening in said header portion.

7. The method of claim 5 wherein step e) comprises removing said inner mold section from said cast header and tank through an opening in said tank portion.

8. The method of claim 5 further including the step of finishing the at least one header portion cast opening prior to step (f).

9. A method of making a heat exchanger comprising the steps of:
   a) providing an inner mold section and outer mold section corresponding respectively to interior and exterior configurations of a desired combined cast header and tank having a header portion integral with a tank portion, said header portion having a plurality of openings therein for passage of fluid and said tank portion having an opening therein for passage of fluid;
   b) connecting said inner mold and outer mold sections with mold material through both the header and tank portion openings to support said inner mold section within said outer mold section and create a space therebetween corresponding to the desired interior and exterior configurations of said combined header and tank;
   c) filling said space with molten metal and solidifying said molten metal to create a combined cast header and tank having a header portion integral with a tank portion, the cast header and tank combination having a plurality of openings in the header portion for passage of fluid into or out of the cast header and tank combination;
   d) removing said cast header and tank combination from said outer mold section;
   e) removing said inner mold section from said cast header and tank combination; and
   f) inserting tubes from a heat exchanger core into said openings in said cast header portion and securing said tubes therein.

10. The method of claim 9 wherein step e) comprises removing said inner mold section from said cast header and tank through an opening in said header portion.

11. The method of claim 9 wherein step e) comprises removing said inner mold section from said cast header and tank through an opening in said tank portion.

12. The method of claim 9 further including the step of finishing the header portion cast openings prior to step (f).

* * * * *